United States Patent
Shen et al.

(10) Patent No.: US 10,429,821 B2
(45) Date of Patent: Oct. 1, 2019

(54) METHOD FOR PRINTING COLORED OBJECT OF 3D PRINTER

(71) Applicants: XYZPRINTING, INC., New Taipei (TW); KINPO ELECTRONICS, INC., New Taipei (TW)

(72) Inventors: Shyh-Yong Shen, New Taipei (TW); Shih-Sen Hsieh, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 239 days.

(21) Appl. No.: 15/436,762

(22) Filed: Feb. 18, 2017

(65) Prior Publication Data

US 2018/0143617 A1    May 24, 2018

(30) Foreign Application Priority Data

Nov. 22, 2016  (TW) .............................. 105138202 A (51) Int. Cl.
*B33Y 10/00* (2015.01)
*B33Y 50/02* (2015.01)
(Continued)

(52) U.S. Cl.
CPC ........ *G05B 19/4099* (2013.01); *B29C 64/106* (2017.08); *B29C 64/118* (2017.08);
(Continued)

(58) Field of Classification Search
CPC ... B29C 64/106; B29C 64/141; B29C 64/386; B33Y 10/00; B33Y 50/02; G05B 19/4099; G05B 2219/35134; G05B 2219/49007
(Continued)

(56) References Cited

U.S. PATENT DOCUMENTS

2004/0112523 A1   6/2004  Crom et al.
2010/0195122 A1   8/2010  Kritchman
(Continued)

FOREIGN PATENT DOCUMENTS

CN    101060990 A    10/2007
CN    104191616 A    12/2014
(Continued)

OTHER PUBLICATIONS

Search Report dated Oct. 9, 2017 of the corresponding European patent application No. 17157330.6.
(Continued)

*Primary Examiner* — Alexander M Weddle
(74) *Attorney, Agent, or Firm* — Chun-Ming Shih; HDLS IPR Services (57) ABSTRACT

A method for printing colored 3D object adopted by a 3D printer (1) comprising a 3D nozzle (3) and a 2D nozzle (4) is disclosed. The method comprises following steps of: inputting a 3D file corresponding to a 3D colored model (5); reading coordinate information and color information of the 3D colored model (5); executing a 3D route slicing process and a 2D image slicing process for respectively generating a route file (6) and an image file (7) for each of a plurality of printing layers; controlling the 3D nozzle (3) to print each slicing object according to each route file (6) of each printing layer; and, controlling the 2D nozzle (4) to color each printed slicing object according to each image file (7) of same printing layer.

16 Claims, 10 Drawing Sheets

(51) Int. Cl.
    *G05B 19/4099* (2006.01)
    *B29C 64/106* (2017.01)
    *B29C 64/141* (2017.01)
    *B29C 64/386* (2017.01)
    *H04N 1/50* (2006.01)
    *B33Y 30/00* (2015.01)
    *B33Y 50/00* (2015.01)
    *B29C 64/118* (2017.01)

(52) U.S. Cl.
    CPC .......... *B29C 64/141* (2017.08); *B29C 64/386* (2017.08); *B33Y 10/00* (2014.12); *B33Y 30/00* (2014.12); *B33Y 50/00* (2014.12); *B33Y 50/02* (2014.12); *H04N 1/50* (2013.01); *B29K 2995/0021* (2013.01); *G05B 2219/35134* (2013.01); *G05B 2219/49007* (2013.01)

(58) Field of Classification Search
    USPC ........................................................ 264/308
    See application file for complete search history.

(56) References Cited

U.S. PATENT DOCUMENTS

2013/0171431 A1    7/2013  Swartz et al.
2016/0311210 A1  10/2016  Günther et al.

FOREIGN PATENT DOCUMENTS

| | | |
|---|---|---|
| EP | 2363270 A2 | 9/2011 |
| EP | 2803492 A1 | 11/2014 |
| WO | 2012058278 A2 | 5/2012 |
| WO | 2015163776 A1 | 10/2015 |
| WO | 2016071421 A1 | 5/2016 |
| WO | 2016171719 A1 | 10/2016 |

OTHER PUBLICATIONS

Search Report dated Dec. 19, 2018 of the corresponding European divisional patent application.

Office Action dated Aug. 9, 2019 of the corresponding China patent application.

METHOD FOR PRINTING COLORED OBJECT OF 3D PRINTER

BACKGROUND OF THE INVENTION

1. Technical Field

The technical field relates to a 3D printer, and specifically to a method for printing a colored object of the 3D printer.

2. Description of Related Art

Due to the maturity of the development of 3D printing technology and also the narrowed size and reduced price of 3D printers, the 3D printers are growing and becoming popular very quick these years.

An ordinary 3D printer is mainly arranged with a 3D nozzle for jetting material, so as to print a 3D object by way of stacking the jetted material upon a printing platform. However, most of the present 3D printers can only print monochromatic objects (i.e., the color of the 3D object equals to that of the material), which is monotonous.

In order to add the color to the printed 3D object, a new type of 3D printer that can print colored 3D objects is provided in the market. In particular, the type of 3D printer adopts a printing method as shown in FIG. 1.

Figure 1:
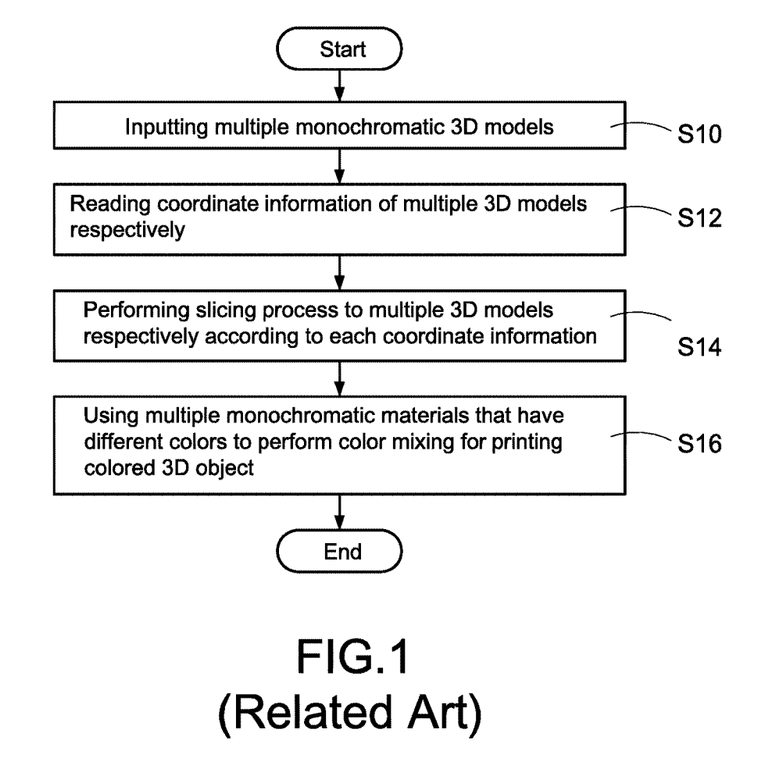
FIG. 1 is a flowchart for printing a colored object of related art.

FIG. 1 is a flowchart for printing a colored object of related art. First, a 3D printer inputs multiple monochromatic 3D models (step S10), and respectively reads coordinate information of the multiple 3D models (step S12). Next, the 3D printer performs a slicing process to the multiple 3D models respectively according to each of the coordinate information (step S14).

In particular, the above-mentioned 3D printer is only arranged with one single 3D nozzle, so it can only identify monochromatic materials. If a colored 3D model is going to be printed, the colored 3D model needs to be transformed into multiple monochromatic 3D models in advance, and the multiple monochromatic 3D models are then inputted to the 3D printer respectively. Therefore, after the slicing process, the 3D printer can use multiple monochromatic materials that have different colors to perform color mixing based on the multiple monochromatic 3D models, so as to print a colored 3D object according to the colored 3D model (step S16).

However, the technical solution in related art is to perform color mixing by way of multiple monochromatic materials in different colors, so the printing cost is very high. Also, the technical solution can only print limited numbers of colors, and it cannot satisfy the demand of full-colored printing.

SUMMARY OF THE INVENTION

The invention is directed to a method for printing colored object of 3D printer, which can print full-colored 3D objects through a 3D printer.

In one of the exemplary embodiments, the method is adopted by a 3D printer that comprises a 3D nozzle and a 2D nozzle, and the method comprises following steps of: inputting a 3D file corresponding to a 3D colored model; reading coordinate information and color information of the 3D colored model; executing a 3D route slicing process and a 2D image slicing process for respectively generating a route file and an image file for each of a plurality of printing layers; controlling the 3D nozzle to print each slicing object according to each route file of each printing layer; and, controlling the 2D nozzle to color each printed slicing object according to each image file of same printing layer.

In comparison with related art, the embodiments of the present invention may perform coloring to each slicing object via an embedded 2D nozzle, so as to reduce printing cost, and to satisfy the demand of full-colored 3D objects printing.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 2:
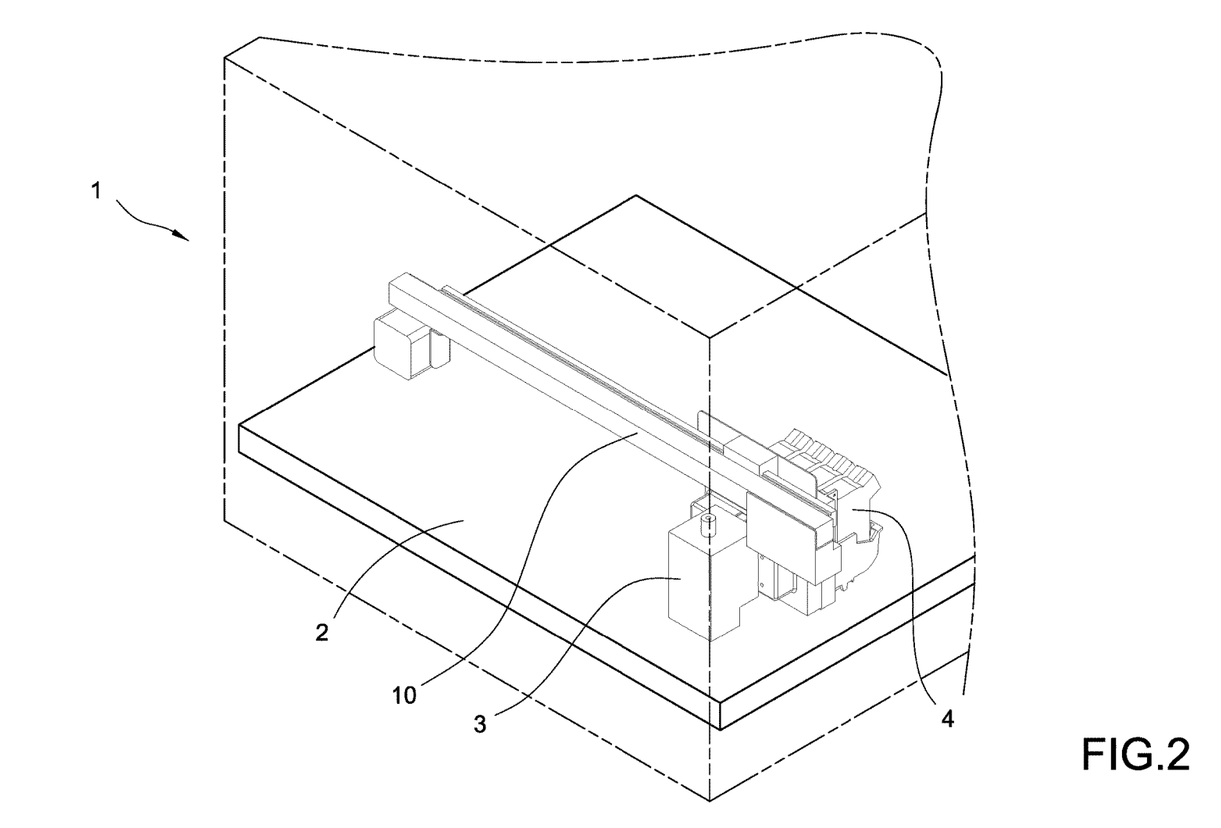
FIG. 2 is a schematic view of a 3D printer according to one embodiment of the present disclosure.

FIG. 2 is a schematic view of a 3D printer according to one embodiment of the present disclosure. The embodiment of FIG. 2 discloses a 3D printer (refers to as the printer 1 hereinafter); the printer 1 is arranged with a printing platform 2, and also arranged with a 3D nozzle 3 and a 2D nozzle 4 upon the printing platform 2. The 3D nozzle 3 is used to jet material for printing 3D objects, and the 2D nozzle 4 is used to jet inks of different colors for coloring the printed 3D objects.

In one embodiment, the 2D nozzle 4 is an ink nozzle adopted by current 2D printers, and the 2D nozzle 4 is connected to multiple ink cartridges storing inks of different colors. In one of the exemplary embodiments, the 2D nozzle 4 may connect with four ink cartridges, wherein the four ink cartridges respectively stores Cyan ink, Magenta ink, Yellow ink and Black ink.

In the embodiment of FIG. 2, the printer 1 is depicted as a fused deposition modeling (FDM) type 3D printer, which comprises the 3D nozzle 3 adopting thermoplastic cable as the material. In other embodiment, the printer 1 may be stereolithography apparatus (SLA) type 3D printer, which comprises the 3D nozzle 3 adopting Photopolymer as the material. The aforementioned embodiments are just parts of example, the method disclosed in the present invention may be adopted by any type of 3D printer, not limited thereto.

As depicted in FIG. 2, the 3D nozzle 3 and the 2D nozzle 4 are arranged at the same control stick 10. In particular, the 3D nozzle 3 and the 2D nozzle 4 are respectively arranged at two opposite sides of one end of the control stick 10, and the printer 1 may control the 3D nozzle 3 and/or the 2D nozzle 4 to move via controlling the control stick 10. In other embodiment, the printer 1 may be arranged with multiple control sticks, and may control the 3D nozzle 3 and the 2D nozzle 4 separately via controlling different control sticks.

In one embodiment of the present invention, the method is to control the 3D nozzle 3 of the printer 1 to print each printing layer of a colored 3D object upon the printing platform 2, and to control the 2D nozzle 4 of the printer 1 to perform coloring to each printing layer once the printing layer is printed completely.

Figure 3:
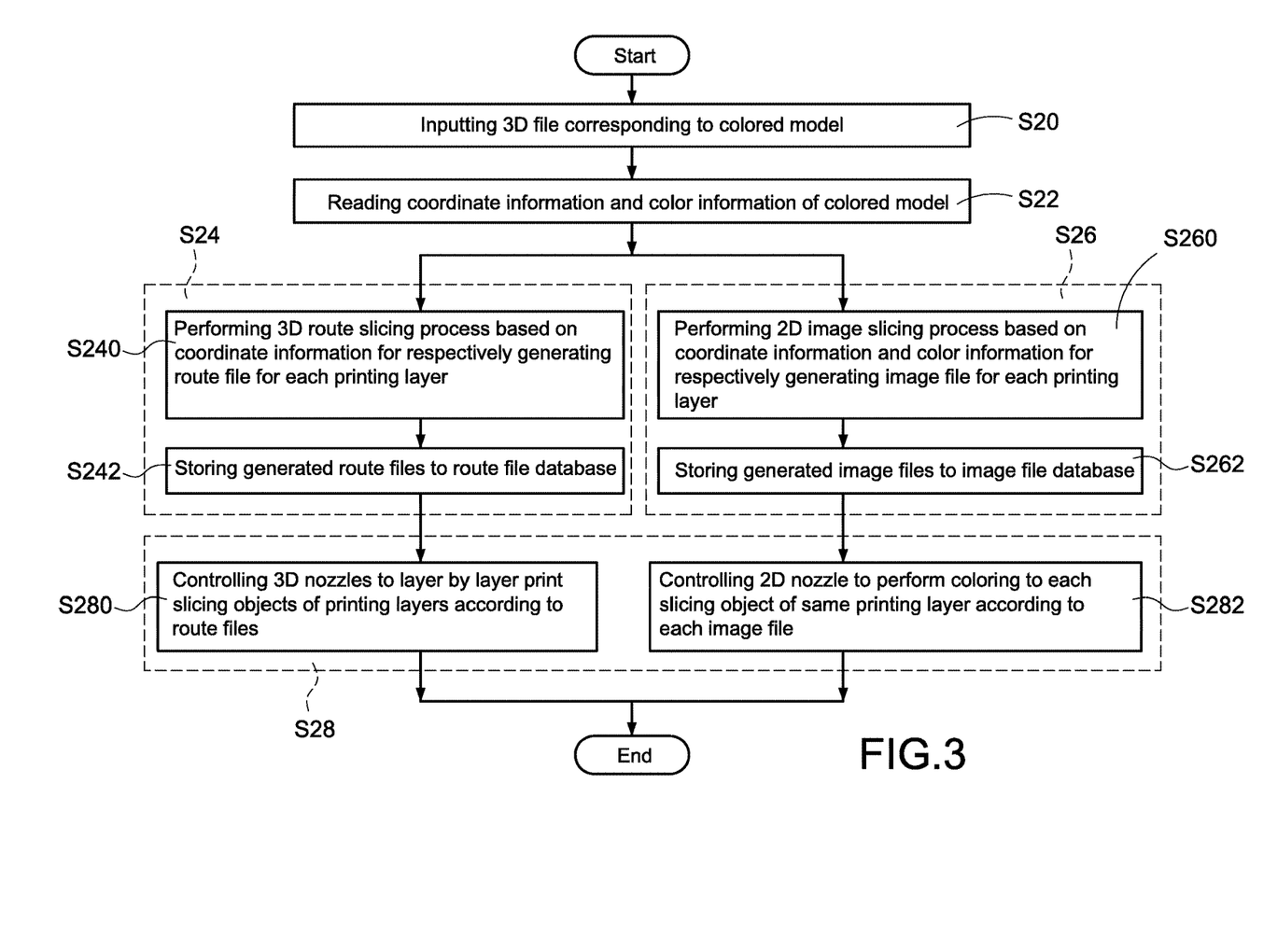
FIG. 3 is a flowchart for processing and printing a colored model according to one embodiment of the present disclosure.

FIG. 3 is a flowchart for processing and printing a colored model according to one embodiment of the present disclosure. The steps disclosed in FIG. 3 may be executed in the printer 1, or be executed in a computer (not shown) connected with the printer 1. In particular, the steps of FIG. 3 may be performed by a processor of the printer 1 or a processor of the computer.

In one embodiment, the method first inputs a 3D file corresponding to a colored model (step S20), in particular, the 3D file is an .OBJ file (file with OBJ extension) or a .PLY file (file with PLY extension) that is pre-edited by the user, and the 3D file records the information of the colored model needed by the user. The step S20 is to input the 3D file to a computer (not shown) or the printer 1, thus the processor of the computer or the printer 1 may read coordinate information and color information of the colored model from the 3D file (step S22).

In one embodiment, the coordinate information indicates the coordinates of each point of the colored model along an X axis, a Y axis and a Z axis of the printer 1, and the color information indicates levels of primary color (R, G, and B) of each point of the colored model.

In one embodiment, the method is to perform two different types of slicing processes after obtaining the coordinate information and the color information of the colored model, and the two types of slicing processes comprise a first slicing process performed to the body of the colored model (step S24) and a second slicing process performed to the image of the colored model (step S26). In the embodiment, the method is to control the 3D nozzle 3 and the 2D nozzle 4 to jet material and inks respectively based on the files generated by the performance of the first slicing process and the second slicing process (step S28), so as to complete the printing action of a colored 3D object.

Specifically, after obtaining the coordinate information and the color information, the method is to perform a 3D route slicing process (i.e., the above-mentioned first slicing process) based on the coordinate information for respectively generating a route file for each of a plurality of printing layers (step S240). In particular, if the colored model is sliced to into one hundred printing layers, then one hundred route files will be generated after the 3D route slicing process. The one hundred route files are respectively corresponding to the one hundred printing layers, and each route file respectively describes a printing route of a slicing object comprised in the corresponding printing layer. In particular, the colored model is implemented by stacking the multiple slicing objects.

In one embodiment, each route file respectively records a layer mark, and the layer mark is used to describe the layer number of the printing layer that is corresponding to the route file. For example, the layer mark of the route file from the first layer is "1", the layer mark of the route file from the tenth layer is "10", and the layer mark of the route file from the one hundredth layer is "100", and so on. During the printing procedure, the printer 1 may obtain the color information of the same printing layer based on the layer mark of each of the route files, so as to perform coloring to the printed slicing object of each printing layer.

Figure 5A:
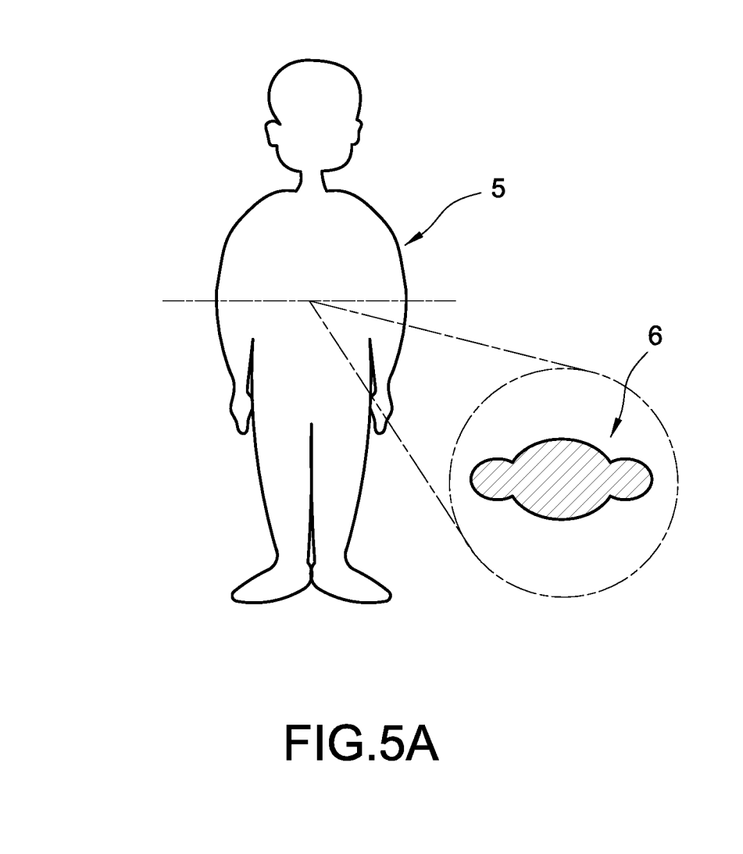
FIG. 5A is a schematic view of a route file according to one embodiment of the present disclosure.

FIG. 5A is a schematic view of a route file according to one embodiment of the present disclosure. The embodiment of FIG. 5A discloses a 3D colored model 5. After the 3D route slicing process is performed by the method to the colored model 5, the plurality of printing layers are sliced and generated, and the plurality of route files are respectively generated for each of the printing layers, wherein each of the route files 6 respectively describes the printing route of the slicing object of the corresponding printing layer. In one embodiment, the route files 6 are "G code" files, but not limited thereto.

Refer back to FIG. 3, after the step S240, the method stores the generated route files to a route file database (step S242). In one embodiment, the route file database may be located at a Cloud server, the computer, the printer 1 or any other devices and places, not limited thereto.

In one embodiment, the 3D route slicing process is an object slicing process that performs to the body of the colored model 5, which is well-known by the skilled person in the art, no more discussion is needed.

Besides the aforementioned steps S240 and S242, the method also performs a 2D image slicing process (i.e., the above-mentioned second slicing process) based on the coordinate information and the color information for respectively generating an image file for each of the printing layers after obtaining the coordinate information and the color information (step S260). In particular, the number of the printing layers generated in the step S260 is the same as that of the printing layers generated in said step S240, and each printing layer has exactly the same layer height. In other words, the number of the plurality of image files is the same as that of the plurality of route files.

In one embodiment, each image file respectively records the aforementioned layer mark, and the layer mark is used to describe the layer number of the printing layer that is corresponding to the image file. For example, the layer mark of the image file from the first layer is "1", the layer mark of the image file from the tenth layer is "10", and the layer mark of the image file from the one hundredth layer is "100", and so on. During the printing procedure, the printer 1 may obtain each of the image files according to the layer mark of each of the route files from the same printing layer, so as to perform coloring to the slicing object of each printing layer via the image file from the same printing layer.

Figure 5B:
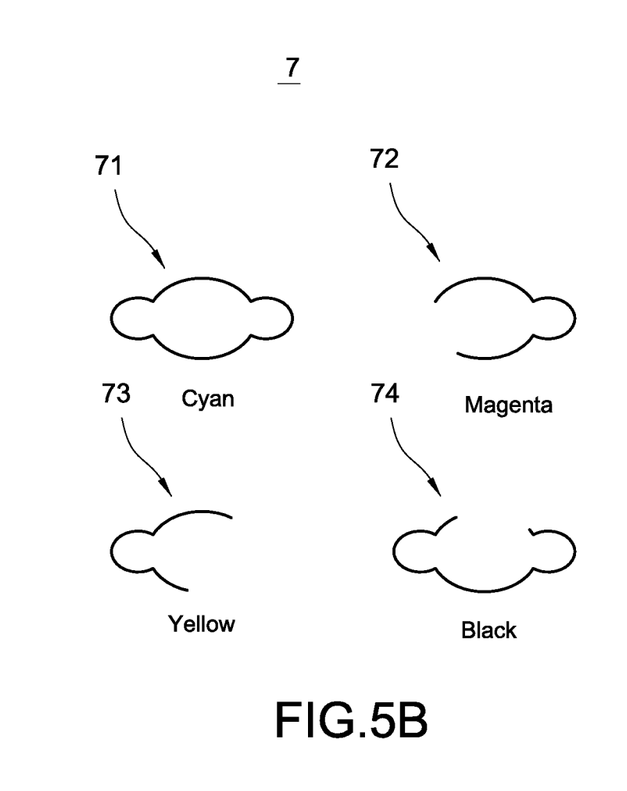
FIG. 5B is a schematic view of an image file according to one embodiment of the present disclosure.

FIG. 5B is a schematic view of an image file according to one embodiment of the present disclosure. As shown in FIG. 5B, after the 2D image slicing process is performed by the method to the colored model 5, the plurality of printing layers are sliced and generated, and a plurality of image files 7 are respectively generated for each of the printing layers, wherein each of the image files 7 respectively describes the color information of the slicing object of the corresponding printing layer. In one embodiment, the image files 7 of each printing layer comprise a cyan image file 71 describing Cyan information of the slicing object, a magenta image file 72 describing Magenta information of the slicing object, a yellow image file 73 describing yellow information of the slicing object and a black image file 74 describing black information of the slicing object. In the embodiment, the image files 7 may be .BMP files, .JPG files, .RAW files, etc., but not limited thereto.

Refer back to FIG. 3, after the step S260, the method stores the generated image files to an image file database (step S262). In one embodiment, the image file database may be located at the Cloud server, the computer, the printer 1 or any other device and place, not limited thereto.

After the 3D route slicing process and the 2D image slicing process are performed completely, the printer 1 may control the 3D nozzles 3 to print the slicing objects of the printing layers, layer by layer, according to the plurality of route files (step S280), and obtain the image file of the same printing layer according to the layer mark of each of the route files, as well as control the 2D nozzle 4 to perform coloring to each printed slicing object of the same printing layer according to each image file (step S282). Therefore, the printer 1 may control the 3D nozzle 3 and the 2D nozzle 4 respectively through the route file and the image file of the same printing layer (i.e., the same layer height), thus locating the 3D nozzle 3 and the 2D nozzle 4 at the same height of Z axis, so as to print the slicing object of the printing layer and then perform coloring to the printed slicing object.

In each of the exemplary embodiments of the present invention, the 3D nozzle 3 uses a monochromatic material to print each of the slicing objects, and the 2D nozzle 4 uses inks of different colors to perform coloring to each of the printed slicing objects according to the content of the image files. Therefore, the printer 1 may print full-colored slicing objects, and stack the plurality of full-colored slicing objects to implement a full-colored 3D object.

Figure 4:
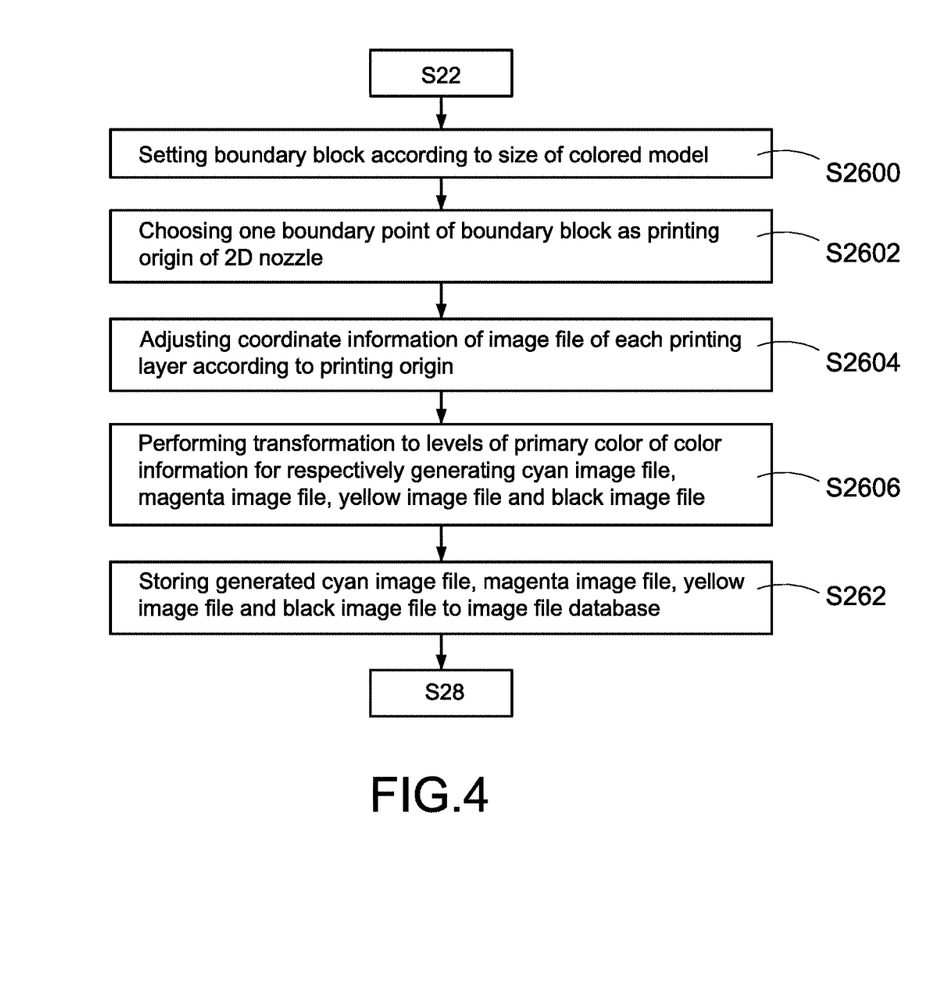
FIG. 4 is a flowchart for 2D image slicing process according to one embodiment of the present disclosure.

FIG. 4 is a flowchart for 2D image slicing process according to one embodiment of the present disclosure. The embodiment of FIG. 4 is used to further describe the second slicing process mentioned at the step S26 of FIG. 3.

In particular, after obtaining the aforementioned coordinate information and the color information at said step S22, the method first sets a boundary block 50 according to the size of the colored model 5 (step S2600), wherein the boundary block 50 is a square and encompasses the entire colored model 5. Next, the method chooses any one boundary point of the boundary block 5 as a printing origin of the 2D nozzle 4 (step S2602). Next, the method adjusts the coordinate information of the image file 7 of each printing layer according to the printing origin (step S2604).

Figure 5C:
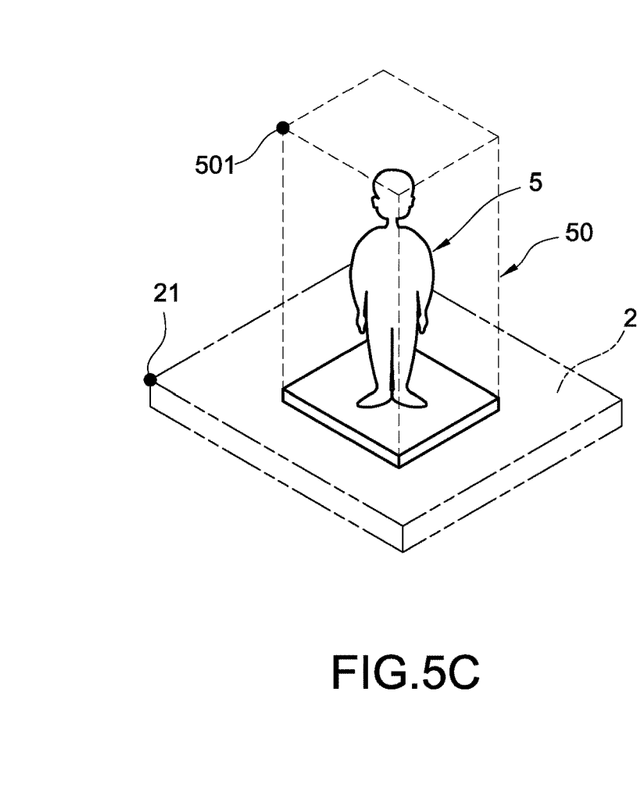
FIG. 5C is a schematic view of a boundary block according to one embodiment of the present disclosure.

Refer also to FIG. 5C; FIG. 5C is a schematic view of a boundary block according to one embodiment of the present disclosure. As shown in this figure, when performing the second slicing process, the method generates a boundary block 50 based on the size of the colored model 5, and chooses any one boundary point of the boundary block 50 as a printing origin 501 of the 2D nozzle 4. In one of the exemplary embodiments, the method may choose the point on the top-left corner of the boundary block 50 as the printing origin 501 for the printing origin 50, but not limited thereto.

In particular, the image files 7 generated by the performance of the second slicing process are used to describe the color information of the slicing object of each printing layer, so the file size of the image files 7 is bigger than that of the route files 6. For reducing the file size of the image files 7, an embodiment of the present invention first sets the boundary block 50, and then performs the slicing process to the image of the colored model 5 that is located in the boundary block 50, and generates the image files 7 that have the same size as that of the boundary block 50 (i.e., the length and the width of the image files 7 are the same as the length and the width of the boundary block 50).

Accordingly, the embodiment is to choose any one boundary point of the boundary block 50 as the printing origin 501 of the 2D nozzle 4, instead of using a default locating point 21 of the printing platform 2 as the printing origin of the 2D nozzle 4. Therefore, the file size of the image files 7 is reduced, and the coloring speed of the 2D nozzle 4 is increased. In one embodiment, the 3D nozzle 3 uses the default locating point 21 of the printing platform 2 as its printing origin. In another embodiment, the 3D nozzle 3 uses the same printing origin 501 as that of the 2D nozzle 4, not limited thereto.

Refer back to FIG. 4, after the step S2604, the method further performs a transformation to the levels of the primary color of the color information for respectively generating the cyan image file 71 corresponding to Cyan information, the magenta image file 72 corresponding to Magenta information, the yellow image file 73 corresponding to Yellow information and the black image file 74 corresponding to Black information for each of the printing layers (step S2606). In other words, the step S2606 is to transform the color information from the primary color (R, G, B) to printing color (C, M, Y, K). Therefore, in the aforementioned step S282 of FIG. 3, the printer 1 may control the four ink cartridges of the 2D nozzle 4 according to the cyan image file 71, the magenta image file 72, the yellow image file 73 and the black image file 74 of each printing layer, so as to perform coloring to each slicing object of each printing layer.

After the step S2606, the method respectively stores the cyan image file 71, the magenta image file 72, the yellow image file 73 and the black image file 74 of each of the printing layers to the image file database (step S262), and then executes the step S28 to perform printing and coloring to each slicing object of each printing layer. In the embodiment, each of the printing layers is respectively corresponding to four image files 71-74, and the four image files 71-74 respectively describes cyan information, magenta information, yellow information and black information of each slicing object of each printing layer.

As mentioned above, the 3D nozzle 3 and the 2D nozzle 4 in one embodiment are respectively arranged on two opposite sides of one end of the control stick 10, so the 3D nozzle 3 and the 2D nozzle 4 may have a spacial distance deviation. In other embodiment, the 3D nozzle 3 and the 2D nozzle 4 may use different printing origins, and they may also have the distance deviation as well. For compensating the distance deviation and making the 2D nozzle 4 to precisely perform coloring to each slicing object printed by the 3D nozzle 3, in one embodiment, the printer 1 may perform an alignment procedure to the 3D nozzle 3 and/or the 2D nozzle 4 before starting printing or coloring.

Figure 6A:
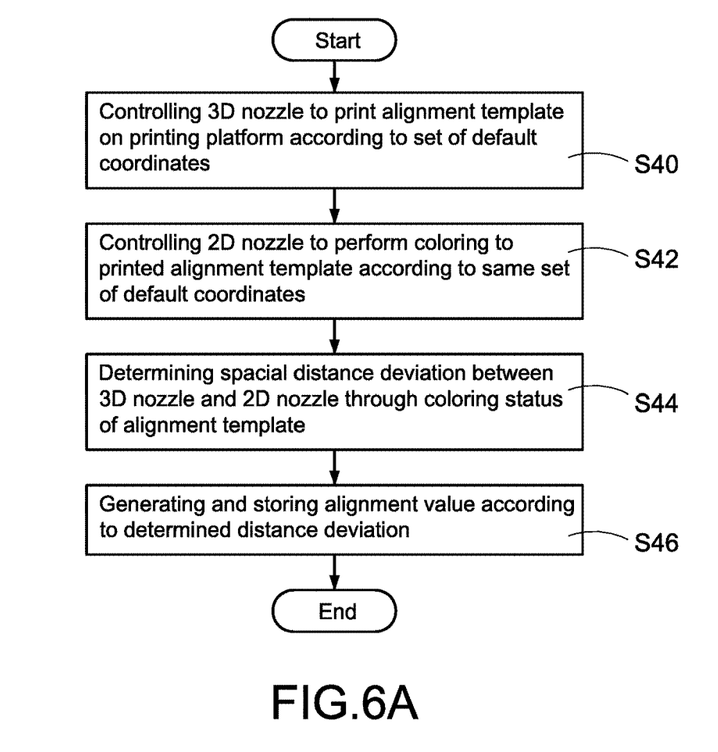
FIG. 6A is a flowchart for generating an alignment value according to one embodiment of the present disclosure.
Figure 6B:
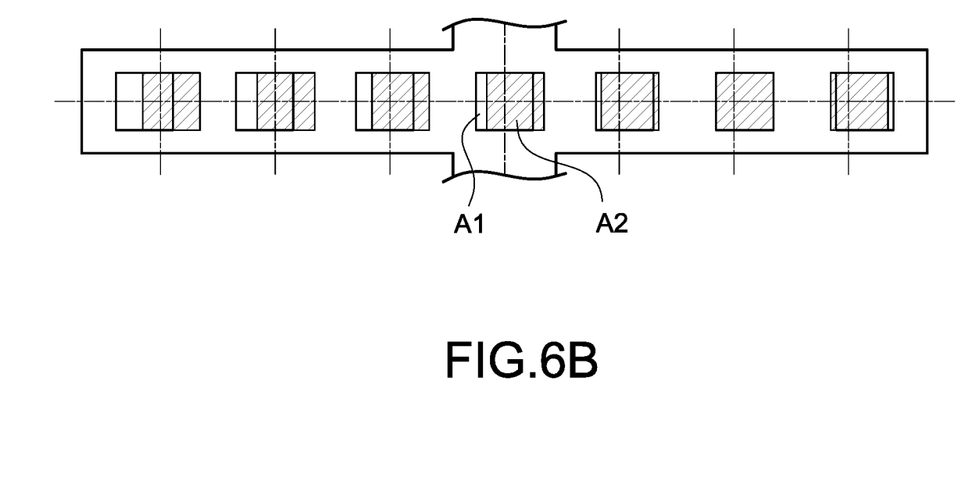
FIG. 6B is a schematic view of alignment according to one embodiment of the present disclosure.

FIG. 6A and FIG. 6B are respectively a flowchart for generating an alignment value according to one embodiment of the present disclosure and a schematic view of alignment according to one embodiment of the present disclosure. In the embodiment, the printer 1 may perform the alignment procedure to the 3D nozzle 3 and/or the 2D nozzle 4 according to a pre-calculated alignment value, wherein the alignment value is calculated through the flowchart as shown in FIG. 6A.

In order to calculate the alignment value, the printer 1 first controls the 3D nozzle 3 to print one or more alignment templates A1 on the printing platform 2 according to a set of default coordinates (step S40). Next, the printer 1 controls the 2D nozzle 4 to perform coloring to the printed alignment template A1 according to the same set of default coordinates (step S42). In particular, the step S42 is to control the 2D nozzle 4 to print an alignment color block A2 directly on the printed alignment template A1 according to the same set of default coordinates. Therefore, the printer 1, a user or a manager may determine the spacial distance deviation between the 3D nozzle 3 and the 2D nozzle 4 by way of the coloring status of the alignment template A1 (i.e., the corresponding situation of the alignment template A1 and the alignment color block A2) (step S44). Next, the printer 1 may generate and store the aforementioned alignment value according to the determined distance deviation (step S46).

For example, the 3D nozzle 3 uses the set of default coordinates to print the square alignment template A1, and the 2D nozzle 4 uses the same set of default coordinates to print the alignment color block A2 that has the same shape and same size as the alignment template A1. If the alignment color block A2 is exactly corresponding to the alignment template A1, it may determine that there's no distance deviation between the 3D nozzle 3 and the 2D nozzle 4. If the alignment color block A2 deviates from the right of the alignment template A1 by 0.2 mm, it may determine that the distance deviation between the 3D nozzle 3 and the 2D nozzle 4 along X axis is +0.2 mm. If the alignment color block A2 deviates from the left of the alignment template A1 by 0.2 mm, it may determine that the distance deviation between the 3D nozzle 3 and the 2D nozzle 4 along X axis is −0.2 mm. If the alignment color block A2 deviates from the top of the alignment template A1 by 0.2 mm, it may determine that the distance deviation between the 3D nozzle 3 and the 2D nozzle 4 along Y axis is +0.2 mm. If the alignment color block A2 deviates from the bottom of the alignment template A1 by 0.2 mm, it may determine that the distance deviation between the 3D nozzle 3 and the 2D nozzle 4 along Y axis is −0.2 mm, and so on.

Figure 7:
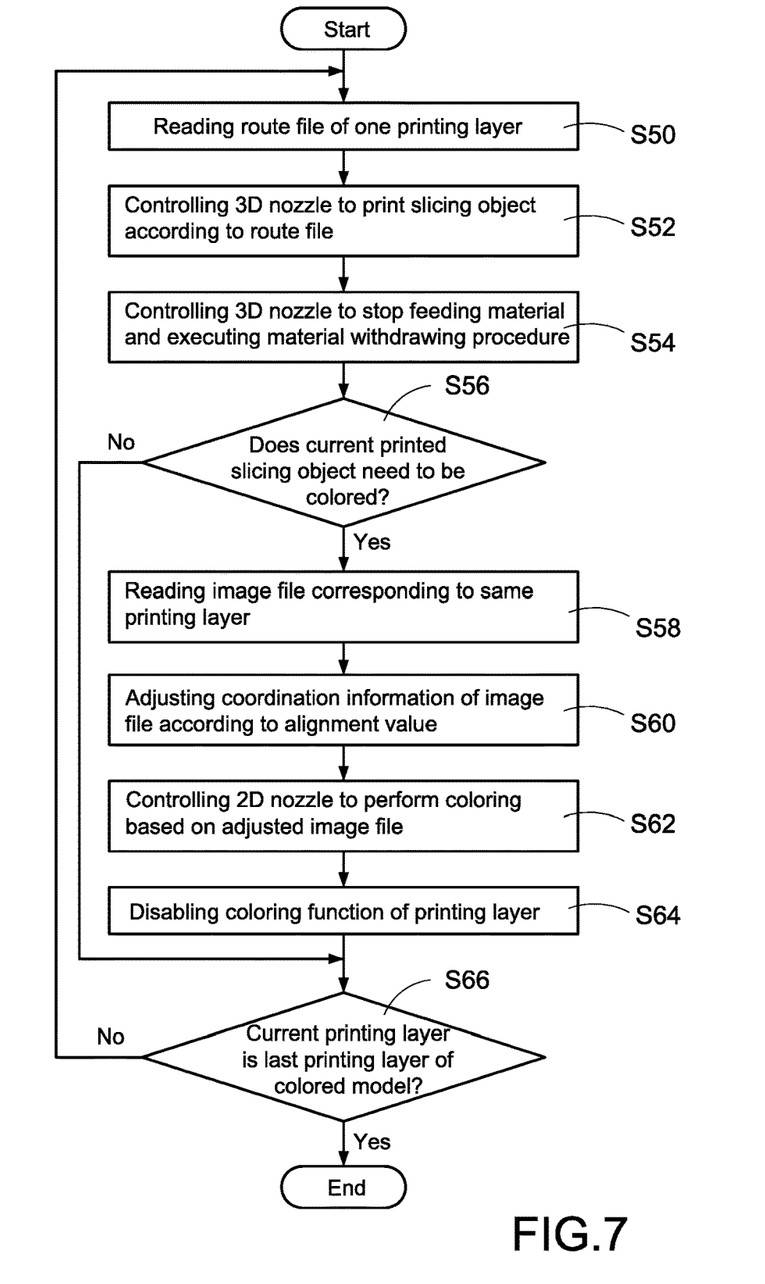
FIG. 7 is a flowchart for printing a colored object according to one embodiment of the present disclosure.

FIG. 7 is a flowchart for printing a colored object according to one embodiment of the present disclosure. The embodiment of FIG. 7 is to further describe how the printer 1 controls the 3D nozzle 3 and the 2D nozzle 4 respectively in the step S28 of FIG. 3.

After finishing the 3D route slicing process and the 2D image slicing process described in each embodiment of the present invention, the printer 1 may print each of the slicing objects layer by layer, and perform coloring to each slicing object of each printing layer after the slicing object is printed. After the slicing object is colored completely, the printer 1 further prints the next slicing object of the next printing layer, and so on.

In the embodiment of FIG. 7, the printer 1 first reads the route file 6 of one of the printing layers (step S50), in particular, the printer 1 is to read the route file 6 of the printing layer from the route file database. Next, the printer 1 controls the 3D nozzle 3 to print the slicing object of the printing layer according to the route file 6 (step S52).

It should be mentioned that the 2D nozzle 4 in the embodiments is to jet inks directly on the printed slicing object, so as to perform coloring to the printed slicing object. As such, the surface of the printed slicing object needs to be kept clean, flat and smooth. In one embodiment, before performing coloring to the printed slicing object, or before printing the next slicing object of the next printing layer, the printer 1 may first control the 3D nozzle 3 to stop feeding the material, and execute a material withdrawing procedure (step S54). Therefore, the printer 1 may first keep the surface of the slicing object clean, flat and smooth, and then proceeds to execute the next printing action. However, in other embodiments, the step S54 may be skipped, not limited thereto.

Next, the printer 1 determines whether the current printed slicing object needs to be colored (step S56), i.e., to determine if the slicing object printed in the step S52 needs to be colored or not. If the slicing object is monochromatic, and the color of the slicing object is the same as the material used by the 3D nozzle 3, the printer 1 may determine that the current printed slicing object doesn't need to be colored.

In one embodiment, the printer 1 may read the route file 6 corresponding to the printing layer, and determines if the slicing object needs to be colored or not according to the content of the route file 6. In other embodiments, the printer 1 may request the image file database directly to check if the image file database comprises the image file 7 that is corresponding to the same printing layer of the current printed slicing object, so as to determine if the current printed slicing object needs to be colored or not. For example, the printer 1 may determine that the current printed slicing object needs to be colored once the image file 7 corresponding to the same printing layer of the slicing object exists in the image file database, and may determine that the slicing object doesn't need to be colored once the image file database doesn't store any image file that is corresponding to the same printing layer of the slicing object.

If the step S56 determines that the slicing object of the printing layer doesn't need to be colored, the printer 1 doesn't need to control the 2D nozzle 4. Next, the printer 1 proceeds to execute the step S66 to determine to continually print the next slicing object of the next printing layer or not.

If the step S56 determines that the slicing object of the printing layer needs to be colored, the printer 1 further reads the image file 7 corresponding to the same printing layer from the image file database (step S58). In one embodiment, the printer 1 is to read the cyan image file 71, the magenta image file 72, the yellow image file 73 and the black image file 74 of the same layer height (for example, the one hundredth layer) from the image file database.

In one embodiment, these image files 71-74 are image files generated by the performance of the 2D image slicing process. In other embodiments, the user may edit the image files 71-74 manually through an external computer after the image files 71-74 are generated by the 2D image slicing process, so as to adapt the image files 71-74 to satisfy the real demand of the user.

After the step S58, the printer 1 controls the 2D nozzle 4 to perform coloring to the slicing object of the same printing layer according to the obtained image file 7 (step S62). In one embodiment, the printer 1 may control the 2D nozzle 4 to move back to the printing origin 501 after obtaining the image file 7, and then control the 2D nozzle 4 to start moving from the printing origin 501 and coloring to the slicing object. Besides, for preventing operation mistakes, the printer 1 may disable a coloring function of the printing layer after the 2D nozzle 4 finishes the coloring of the slicing object (step S64).

In one embodiment, the printer 1 may read the aforementioned alignment value before performing coloring via the 2D nozzle 4, and adjust the coordination information of the image file 7 obtained in the step S58 according to the alignment value (step S60). Furthermore, in the step S62, the printer 1 may control the 2D nozzle 4 to perform coloring based on the adjusted image file 7.

For example, if the coordinate of one of the locating points recorded in the image file 7 is: (100, 90, 90), and the alignment value is "X axis+0.5 mm", therefore, after the aforementioned adjustment, the coordinate of the locating point will be changed to (100.5, 90, 90). However, the description is just one of the exemplary embodiments, not limited thereto. In another embodiment, if the 3D nozzle 3 and the 2D nozzle 4 both adopt the locating point 21 of the printing platform 2 as the printing origin, the printer 1 doesn't need to perform alignment to the 3D nozzle 3 and/or the 2D nozzle 4, thus the step S60 doesn't need to be executed.

After the slicing object of the printing layer is colored completely, the printer 1 determines if the current printing layer is the last printing layer of the colored model 5 or not (step S66). In one embodiment, the printer 1 may determine if any unread route file 6 exists in the route file database, so as to determine if the current printing layer is the last printing layer of the colored model 5 or not. In other embodiments, the printer 1 may determine whether the current printing layer is the last printing layer of the colored model 5 according to a printing terminated notification sent from external device.

If the current printing layer is not the last printing layer of the colored model 5, the printer 1 re-executes the step S50 to the step S64, so as to print the next slicing object of the next printing layer, and to perform coloring to the next slicing object. On the contrary, if the current printing layer is the last printing layer of the colored model 5, the printer 1 terminates the printing action.

Figure 8:
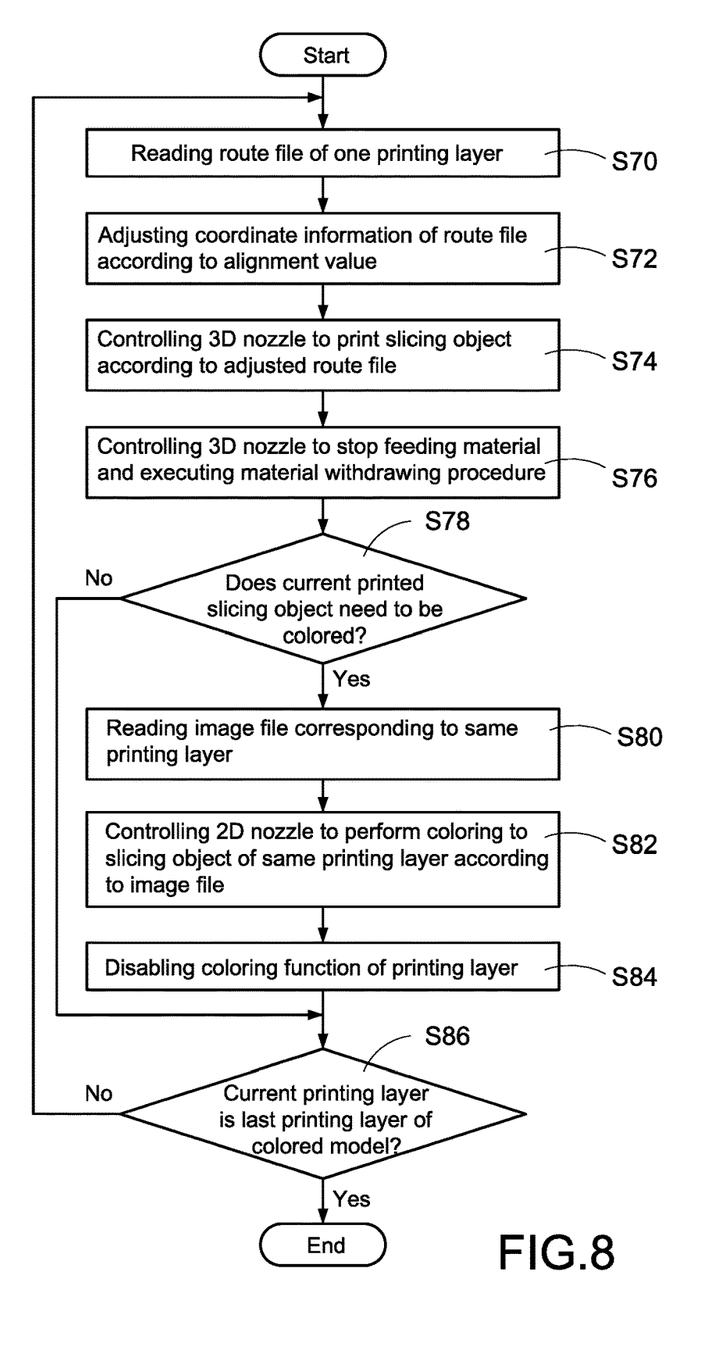
FIG. 8 is a flowchart for printing the colored object according to other embodiment of the present disclosure.

FIG. 8 is a flowchart for printing the colored object according to another embodiment of the present disclosure. The steps S70, S74-S80, and S82-S86 of the embodiment of FIG. 8 are similar to the steps S50, S52-S58, and S62-S66 of the embodiment of FIG. 7. The difference between the embodiment of FIG. 8 and the embodiment of FIG. 7 is that the printer 1 in FIG. 8 first obtains the alignment value before controlling the 3D nozzle 3 to print the slicing object of one of the printing layers, and executes the step S72 to adjust the coordinate information of the route file 6 of the printing layer according to the alignment value, and then proceeds to execute the step S74 for controlling the 3D nozzle 3 to print the slicing object of the printing layer according to the adjusted route file 6.

In the embodiment of FIG. 8, the printer 1 performs the alignment procedure to the 3D nozzle 3 according to the alignment value. As a result, after reading the image file 7 corresponding to the same printing layer in the step S80, the printer 1 doesn't need to perform the alignment procedure to the 2D nozzle 4 and may execute the step S82 directly for controlling the 2D nozzle 4 to perform coloring to the slicing object of the same printing layer according to the image file 7.

As mentioned above, the exemplary embodiments of the present invention are to perform coloring to each of the slicing objects printed by the 3D nozzle 3 via the 2D nozzle 4, and the 2D nozzle 4 may be the ink nozzle adopted by the current 2D printer. Therefore, in one embodiment, the printer 1 may use the operation of the 2D nozzle 4 to implement full-colored 2D printing actions on the printing platform 2. Besides, in the embodiment, the printer 1 controls the movement of the 3D nozzle 3 and the 2D nozzle 4 via stepper motor(s) (not shown), so the printer 1 may use the pulses generated by the operations of the stepper motor(s) as the substitute for the sensing information sensed by linear scale (not shown) of the current 2D printer.

Figure 9:
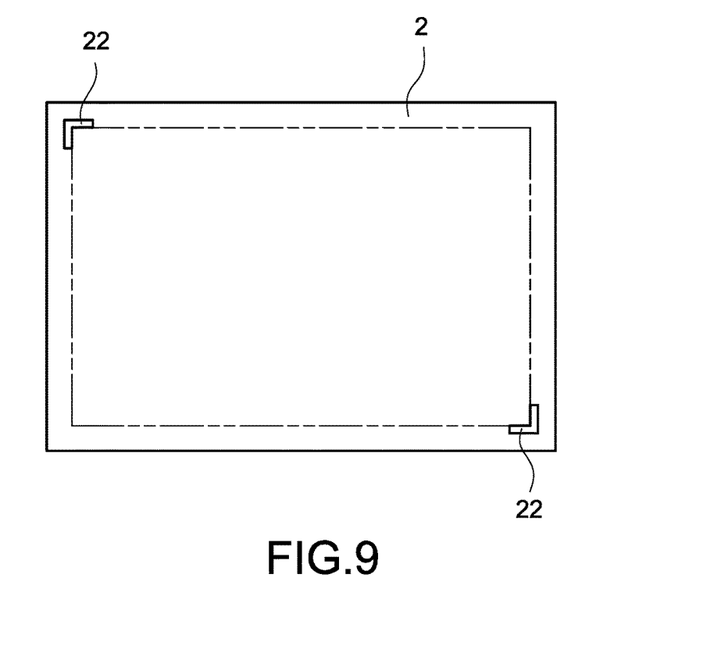
FIG. 9 is a schematic view of a boundary according to one embodiment of the present disclosure.
Figure 10:
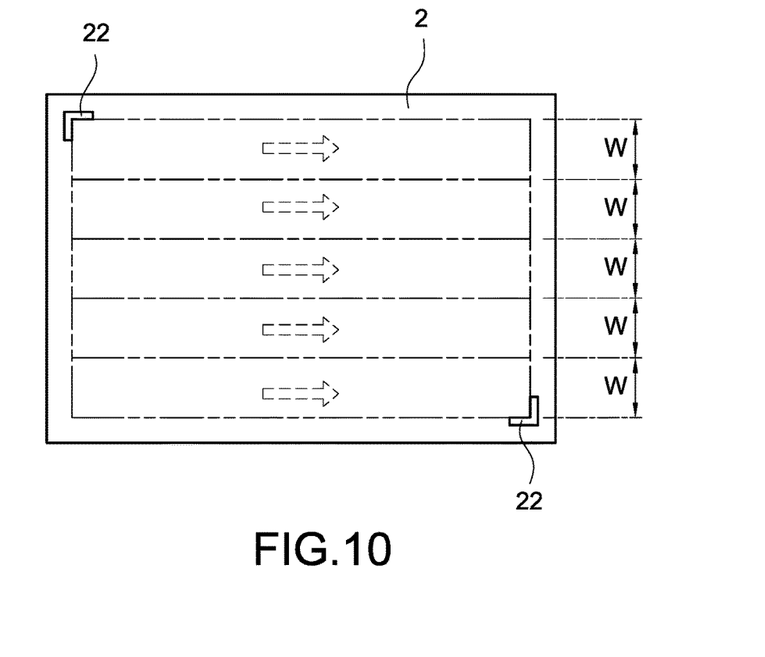
FIG. 10 is a schematic view of 2D printing according to one embodiment of the present disclosure.

FIG. 9 and FIG. 10 are respectively a schematic view of a boundary according to one embodiment of the present disclosure and a schematic view of 2D printing according to one embodiment of the present disclosure. As shown in FIG. 9, the printer 1 in one embodiment may be set with a boundary mark 22 on at least one corner of the printing platform 2 according to a size to be printed (i.e., the size of a paper to be printed, such as an A4 paper or a B5 paper). If the user needs to perform the 2D printing action through the printer 1, he or she may put the paper on the printing platform 2 and align the paper with the boundary mark 22. Therefore, it may use the 2D nozzle 4 to print words or image contents on the paper.

In particular, the 2D printing action is similar to the coloring approach described above, the difference is that the above mentioned coloring approach is to control the 2D nozzle 4 to jet inks on each printed slicing object, and the 2D printing action in this embodiment is to control the 2D nozzle 4 to jet inks on the paper upon the printing platform 2.

As shown in FIG. 10, when controlling the 2D nozzle 4 to move along the X axis, the printer 1 is to calculate the operation of the stepper motor(s) therein to reach the same effect provided by the linear scale of the current 2D printer. When controlling the 2D nozzle 4 to move along the Y axis, the printer 1 is to control the 2D nozzle 4 to move a distance of ink cartridge width W for each time, so as to perform printing for next column of a 2D document, until the whole 2D document is printed completely.

According to the exemplary embodiments of the present invention, the method may read a single 3D file corresponding to a colored model, and control a 3D nozzle and a 2D nozzle to respectively perform printing and coloring for each slicing object of each printing layer of the colored model, so as to stack multiple slicing objects for implementing a full-colored 3D object, which is very convenient.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for printing colored object using a 3D printer (1) and both 3D coordinates and color data acquired from a colored model (5), the method comprising:
 a) inputting a 3D file of the colored model (5) at a processor;
 b) reading coordinate information and color information of the colored model (5) by the processor;
 c) performing a 3D route slicing process by the processor according to the coordinate information for respectively generating a route file (6) for each of a plurality of printing layers, wherein each route file (6) respectively records a printing route and a layer mark of one of the printing layers;
 d) performing a 2D image slicing process by the processor according to the coordinate information and the color information for respectively generating an image file (7) for each of the printing layers, wherein each image file (7) respectively records color information and the layer mark of one of the printing layers; and
 e) controlling a single 3D nozzle (3) of the 3D printer (1) to print a slicing object of each printing layer according to the printing route of each route file (6) of each printing layer, obtaining each image file (7) corresponding to the current printing layer according to the layer mark of each route file (6), and controlling a 2D nozzle (4) of the 3D printer (1) to perform coloring to directly on each printed slicing object of the current printing layer according to the color information of each obtained image file (7) after each slicing object is completely printed.

2. The method for printing colored object of 3D printer in claim 1, wherein the step e comprises following steps of:
   e1) reading the route file (6) that is corresponding to one of the printing layers;
   e2) controlling the 3D nozzle (3) to print the slicing object of the printing layer according to the route file (6);
   e3) determining if the printed slicing object needs to be colored;
   e4) reading the image file (7) that is corresponding to the current printing layer when determining that the printed slicing object needs to be colored;
   e5) controlling the 2D nozzle (4) to perform coloring to the slicing object according to the image file (7); and
   e6) re-executing the step e1 to the step e5 to print next slicing object of next printing layer and to perform coloring to the next slicing object if the current printing layer is not a last printing layer of the colored model (5).

3. The method for printing colored object of 3D printer in claim 2, further comprising a step e21: controlling the 3D nozzle (3) to stop feeding materials and performing a material withdrawing procedure after the slicing object is printed completely.

4. The method for printing colored object of 3D printer in claim 3, wherein the image file (7) of each printing layer comprises a cyan image file (71) for describing Cyan information, a magenta image file (72) for describing Magenta information, a yellow image file (73) for describing Yellow information and a black image file (74) for describing Black information.

5. The method for printing colored object of 3D printer in claim 3, wherein the step d comprises following steps of:
   d1) performing a transformation to levels of primary color of the color information for generating a cyan image file (71), a magenta image file (72), a yellow image file (73) and a black image file (74) corresponding to Cyan information, Magenta information, Yellow information and Black information respectively for each of the printing layers; and
   d2) respectively storing the cyan image file (71), the magenta image file (72), the yellow image file (73) and the black image file (74) of each printing layer.

6. The method for printing colored object of 3D printer in claim 5, wherein the 2D nozzle (4) comprises four ink cartridges respectively corresponding to cyan ink, magenta ink, yellow ink and black ink, and the step e5 is to respectively control the four ink cartridges of the 2D nozzle (4) to jet inks to perform coloring to the slicing object according to the cyan image file (71), the magenta image file (72), the yellow image file (73) and the black image file (74).

7. The method for printing colored object of 3D printer in claim 5, wherein the image file (7) is a .BMP file, a .JPG file or a .RAW file.

8. The method for printing colored object of 3D printer in claim 3, wherein the step d comprises following steps of:
   d1) setting a square boundary block (50) according to a size of the colored model (5);
   d2) choosing one boundary point of the boundary block (50) as a printing origin (501) of the 2D nozzle (4); and
   d3) adjusting the coordinate information of the image file (7) of each printing layer according to the printing origin (501).

9. The method for printing colored object of 3D printer in claim 8, wherein the step d2 is to choose a point on a top-left corner of the boundary block (50) as the printing origin (501) of the 2D nozzle (4).

10. The method for printing colored object of 3D printer in claim 8, further comprising a step e7: reading a pre-stored alignment value after the step e4 and adjusting the coordinate information of the image file (7) corresponding to the current printing layer according to the alignment value;
    wherein, the step e5 is to control the 2D nozzle (4) to perform coloring to the slicing object of the printing layer according to the adjusted image file (7).

11. The method for printing colored object of 3D printer in claim 10, further comprising following steps before the step a:
    a01) controlling the 3D nozzle (3) to print an alignment template (A1) according to a set of default coordinates;
    a02) controlling the 2D nozzle (4) to perform coloring to the printed alignment template (A2) according to the same set of default coordinates;
    a03) determining a spatial distance deviation between the 3D nozzle (3) and the 2D nozzle (4) according to coloring status of the alignment template (A1); and
    a04) generating and storing the alignment value according to the spatial distance deviation.

12. The method for printing colored object of 3D printer in claim 8, further comprising a step e8: reading a pre-stored alignment value after the step e1 and adjusting the coordinate information of the route file (6) of the printing layer according to the alignment value;
    wherein, the step e2 is to control the 3D nozzle (3) to print the slicing object of the printing layer according to the adjusted route file (6).

13. The method for printing colored object of 3D printer in claim 12, further comprising following steps before the step a:
    a11) controlling the 3D nozzle (3) to print an alignment template (A1) according to a set of default coordinates;
    a12) controlling the 2D nozzle (4) to perform coloring to the printed alignment template (A2) according to the same set of default coordinates;
    a13) determining a spatial distance deviation between the 3D nozzle (3) and the 2D nozzle (4) according to coloring status of the alignment template (A1); and
    a14) generating and storing the alignment value according to the spatial distance deviation.

14. The method for printing colored object of 3D printer in claim 1, wherein the 3D file is an .OBJ file or a .PLY file.

15. The method for printing colored object of 3D printer in claim 1, wherein the 3D printer comprises a printing platform and the method further comprises following steps:
    f1) providing a boundary mark, wherein the boundary mark is arranged at one corner of the printing platform;
    f2) accepting a paper setting upon the printing platform, wherein a set paper is aligned with the boundary mark; and
    f3) controlling the 2D nozzle to move and perform a 2D printing action for printing words or image contents on the paper.

16. The method for printing colored object of 3D printer in claim 15, wherein the step f3 comprises following steps:

f31) controlling the 2D nozzle through a stepper motor of the 3D printer to move along an X axis of the 3D printer and to jet cyan ink, magenta ink, yellow ink and black ink on the paper; and f32) controlling the 2D nozzle to move along a Y axis of the 3D printer with a width of an ink cartridge of the 2D nozzle for performing next 2D printing action after the previous 2D printing action of the X axis is completed.

\* \* \* \* \*